April 20, 1965     O. M. ULBING     3,178,951
VIBRATORY MOTOR

Filed Jan. 22, 1964     2 Sheets-Sheet 1

INVENTOR.
OTMAR M. ULBING
BY
ATTORNEY

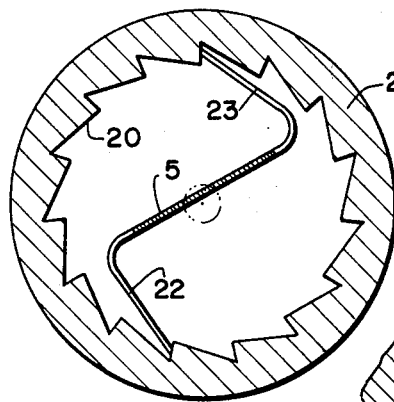
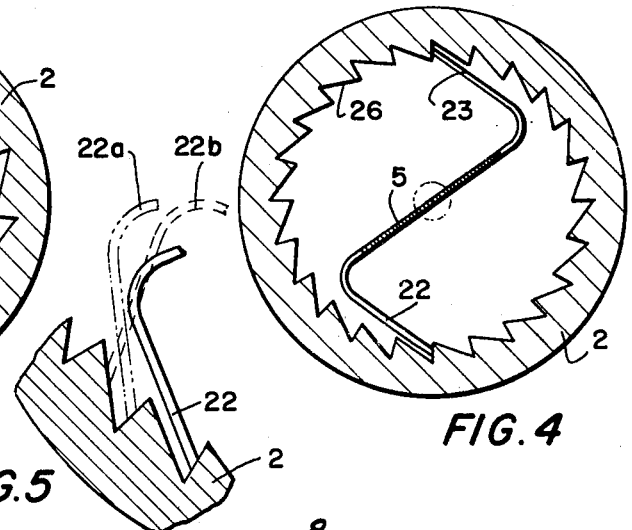
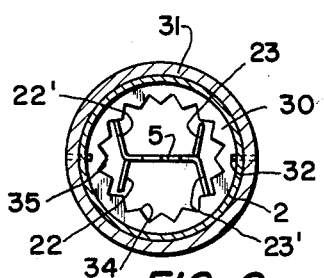
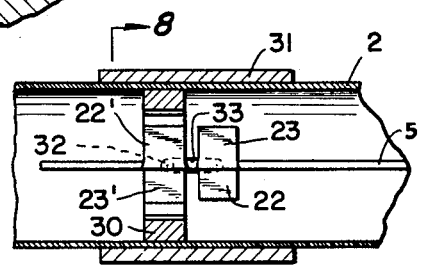
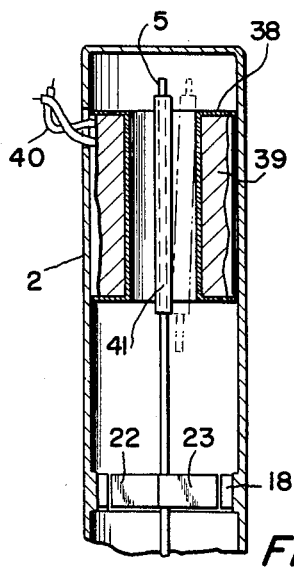
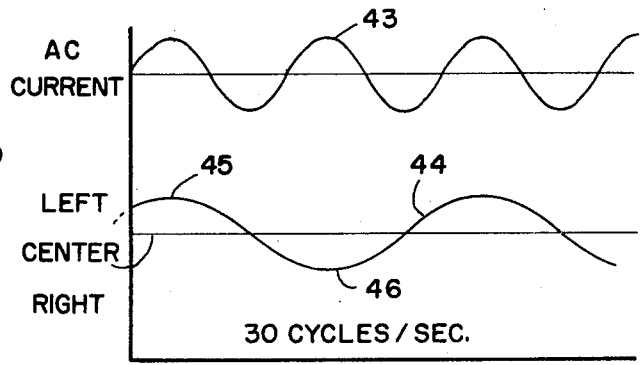
INVENTOR.
OTMAR M. ULBING
BY
David W. Tibbott
ATTORNEY United States Patent Office 3,178,951
Patented Apr. 20, 1965

3,178,951
VIBRATORY MOTOR
Otmar M. Ulbing, Lisle, N.Y., assignor to Ingersoll-Rand Company, New York, N.Y., a corporation of New Jersey
Filed Jan. 22, 1964, Ser. No. 339,517
7 Claims. (Cl. 74—126)

This invention relates to small vibrating motors which may be actuated by either pressure fluids or electromagnetic forces.

The principal object of this invention is to provide a novel and advantageous vibratory motor which may be used, for example, in small power tools, such as pencil-size power screw-drivers, for powering toys and as a low speed timing motor.

Other important objects include the following: to provide a small motor which can be manufactured economically; to provide a vibratory motor mechanism suited for use in either pressure fluid motors or electro-magnetic motors; to provide a small motor particularly useful for powering "pencil" size tools; to provide a vibratory motor which is easily adjusted to operate at different speeds and can be readily reversed during operation; and to provide a small motor capable of running at relatively low speeds and supplying relatively high torques.

The invention is described in connection with the accompanying drawings wherein:

FIG. 4 is a section similar to FIG. 2 and illustrating another embodiment using a greater number of ratchet teeth in the unidirectional clutch mechanism;

FIG. 5 is an enlarged fragmentary view of FIG. 4;

FIG. 6 is another section similar to FIG. 2 and illustrating a third embodiment using an odd number of ratchet teeth, instead of an even number of teeth;

FIG. 7 is a fragmentary section illustrating another embodiment containing a reversing mechanism;

FIG. 8 is a section taken along the line 8—8 of FIG. 7;

FIG. 9 is a fragmentary section of still another embodiment using an electrical magnet for driving the reed; and FIG. 10 is a curve illustrating the movement of the vibrating vane in relationship to the alternating current.

Figure 1:
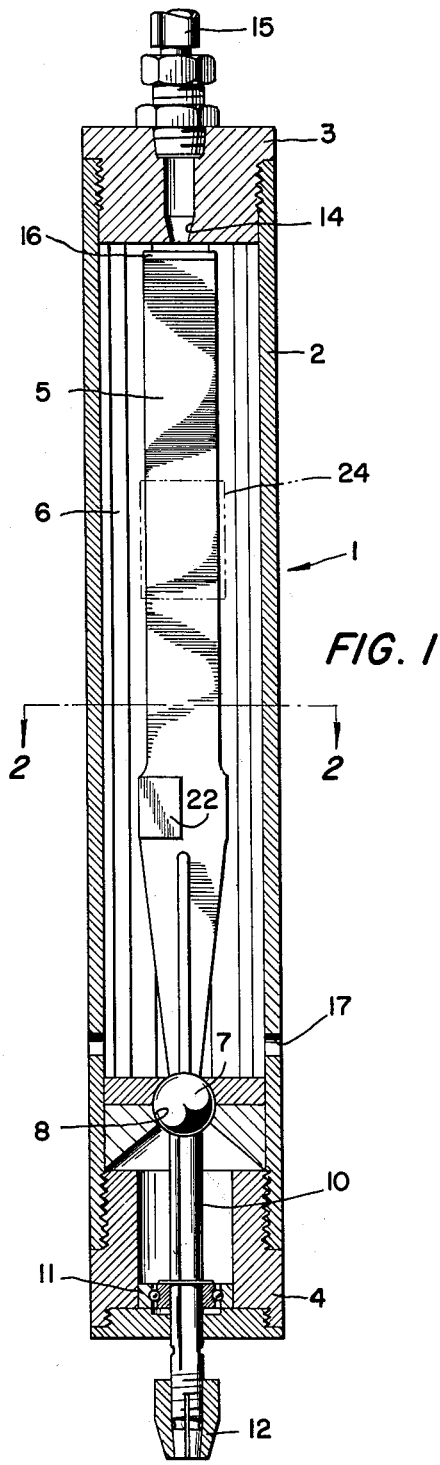
FIG. 1 is an axial sectional view of a tool embodying the invention.

The tool 1 shown in FIG. 1 includes an elongate hollow tubular housing 2 which is closed at opposite ends by a back head 3 and a front head 4. An elongate flexible reed 5 is mounted in the cavity 6 of the housing 2 by a means which allows the reed 5 to rotate about its longitudinal axis. This means includes a ball 7 fixed to the front end of the reed 5 and an annular concave socket or bearing 8 surrounding the ball and fixed to the interior of the housing. This type of mounting allows the reed 5 to rotate freely while oscillating or vibrating without the ball 7 binding in the socket 8. In other words, the ball 7 and soket 8 serve as a universal joint. The reed 5 is composed of a resilient material which allows its unsupported portion, located rearwardly of the ball 7, to flex and vibrate or swing back and forth to opposite sides of its longitudinal axis.

The ball 7 is also fixed to the rear end of a spindle 10 which extends forwardly through the front head 4 and is rotatably mounted in a bearing 11 supported in the front head 4. The front end of the spindle 10 carries a conventional chuck 12 which may be connected to tool bits (not shown). As the reed 5 rotates generally about its longitudinal axis, it rotatably drives the spindle 10 whereby the spindle can perform useful work, for example, driving a small screwdriver.

The back head 3 contains an axial orifice 14 connected to a flexible hose 15 which in turn is connected to a suitable source (not shown) of pressure fluid, such as compressed air. The rear end 16 of the reed 5 is located close to the discharge end of the orifice 14 and is arranged so that the pressure fluid exiting from the orifice 14 will drive the reed 5 back and forth in a vibratory motion at substantially right angles to the axis of the reed. This is accomplished by mounting the reed 5 so that its longitudinal axis is substantially aligned with the orifice 14. In addition, the rear end 16 of the reed 5 is cut or beveled at an acute angle to its axis so that it can be initially started in vibration by the fluid discharging from the orifice 14 when the reed 5 is at rest and axially aligned with the orifice. The fluid is exhausted from the housing 2 through the exhaust ports 17.

Figure 3:
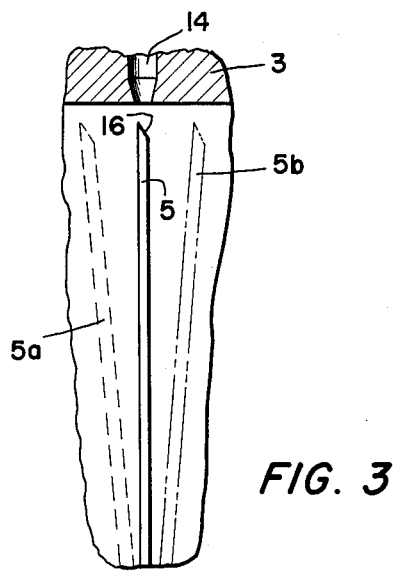
FIG. 3 is a fragmentary and axial section of the tool of FIG. 1 showing the vibrating reed in three positions.

For example, looking at FIG. 3, if the reed 5 were at rest when fluid begins flowing through the orifice 14, as shown in solid lines in FIG. 3, and impinging on the beveled rear end 16 of the reed, the reed 5 will be driven to the left as shown in FIG. 3 to the dotted-line position indicated as 5a. Eventually, the reed 5 will reach the end of its travel due to the increasing stress in the reed.

After stopping, the reed 5 will begin swinging in the opposite direction toward the center of its travel. Its inertia will carry it past its center position, as shown in solid lines in FIG. 3, and the fluid stream from the orifice 14 will impinge on its lfet face to drive it toward the right, as shown in FIG. 3. Eventually, it will come to a stop in the dot-dashed line position 5b shown in FIG. 3 and reverse its movements again. Each time the reed 5 passes its center position, the fluid jet will give it another impulse to continue driving it in vibration. It will be understood that the movement of the rear portion of the reed 5 is provided by the bending or flexing of the reed and not by the ball 7 substantially oscillating in the socket 8.

A vibrating portion of the reed 5 is connected to the interior of the housing 2 by a unidirectional clutch 18 which forces the reed 5 to rotate about its longitudinal axis relative to the housing as it vibrates. The clutch 18 includes an annular set of ratchet teeth 19 surrounding the reed 5. Each tooth 19 includes a substantially radial shoulder 20 and a substantially tangential ramp 21 joining the shoulder 20.

In addition to the ratchet teeth 19, the clutch 18 includes a pair of substantially tangential legs 22 and 23 extending from the opposite longitudinal edges of the reed 5 in opposite directions from each other. As seen in cross-section in FIG. 2, the legs 22 and 23 are located on the reed 5 to form a Z-shape. The legs 22 and 23 are flexible so that they can bend and pass over the ramps 21 of the ratchet teeth 19 as the reed vibrates.

Figure 2:
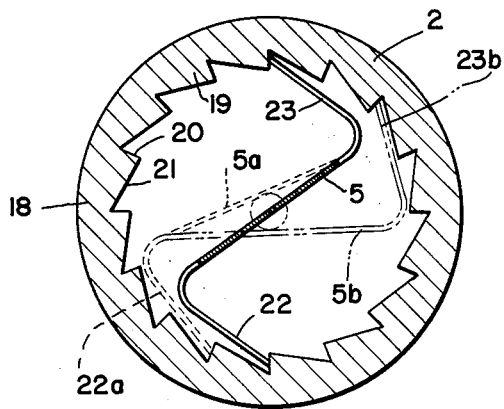
FIG. 2 is an enlarged section taken on the line 2—2 of FIG. 1 and showing alternate positions of the vibratory reed in dotted and dot-dashed lines during operation of the vibratory motor of this invention.

FIG. 2 illustrates how the clutch 18 operates to convert the vibration of the reed 5 into a rotary movement of the reed 5. When the reed 5 is stationary, it is axially aligned with the orifice 14 in the center of the housing 2 and the legs 22 and 23 are resting against a pair of diametrically aligned shoulders 20 on the ratchet teeth 19, as shown in solid lines in FIG. 2.

Next, we assume that the reed 5 vibrates upward looking at FIG. 2 to the position 5a shown in dotted lines. In moving to the dotted-line position indicated as 5a in FIG. 2, the clutch leg 22 is free to ride up and over a ramp 21 of a ratchet tooth 19 to the position 22a while the clutch leg 23 is prevented from moving by a ratchet tooth shoulder 20; as a result, the reed 5 is forced to rotate in a clockwise direction relative to the housing 2.

Next, we assume that the reed 5 moves downward from the dotted-line position 5a shown in FIG. 2 to the dot-dashed line position 5b shown in FIG. 2. In moving to this last position, the clutch leg 22a abuts a shoulder 20 which prevents it from moving while the clutch leg 23 moves over the ramps 21 of two ratchet teeth 19 to the position 23b, shown in FIG. 2. As a result, the reed 5 again rotates in the clockwise direction relative to the housing 2.

It should now be clear that as the reed 5 vibrates back and forth, it is progressively rotated in a clockwise direction by the clutch 18. This type of motor may be driven at relatively low rotational speeds of the spindle 10 while producing relatively high torques.

The vibration frequency of the reed 5 can be changed to vary the speed of the motor. One method for accomplishing this function is to provide the reed 5 with a weight 24, shown in dotted lines in FIG. 1, which can be adjusted along its length to vary its natural frequency.

Another way of varying the speed of the motor is shown in FIG. 4. This embodiment contains a greater number of ratchet teeth 26 in the unidirectional clutch 18 which causes the motor's rotary speed to be reduced. Since the teeth 26 are greater in number than in FIG. 2, they are also closer together. As a result, if the total travel distance of the reed 5 is the same as in FIG. 2, the legs 22 and 23 will be able to move in a reverse direction for a portion of their forward travel. This reverse travel of the legs will be "lost motion" which must be subtracted from their forward travel to obtain their effective movement in the forward direction. Hence, the effective travel of the legs 22 and 23 will be less in FIG. 4 than in FIG. 2, since the legs 22 and 23 do not have any "lost motion" in FIG. 2.

The reduced effective travel of the legs 22 and 23 per cycle of the reed 5 in FIG. 4 results in a reduced rotary speed of the reed 5.

FIG. 5 illustrates the foregoing explanation. The initial position of the leg 22 is shown in solid lines. As the reed 5 moves upward to the top end of its travel, as shown in FIG. 5, the leg 22 will travel over one tooth 26 and halfway up the next tooth 26 to the position 22a shown in dotted lines. Thereafter, when the reed 5 moves downward, as shown in FIG. 5, the leg 22 will reverse itself and move to the position 22b, shown in dot-dashed lines. Thus, the movement from 22a to 22b is "lost motion" and cancels a portion of the rotary travel of the reed 5.

FIG. 6 shows another embodiment utilizing an odd number of ratchet teeth 28. The use of an odd number of teeth prevents any teeth from being located diametrically opposite each other. Thus, when the reed 5 is at rest with its legs 22 and 23 resting on shoulders 20 of the teeth 28, the reed cannot be in the exact center of the ratchet, but is always off center when at rest. When the reed 5 is slightly off center, it is more easily started into vibration by the jet of fluid issuing from the orifice 14. This embodiment eliminates the need for beveling the rear end 16 of the reed 5, as shown in FIG. 3, to unbalance the reed 5 so that it can be prompted into vibration initially by the fluid jet when it is at rest in axial alignment with the orifice 14.

The embodiment shown in FIGS. 7 and 8 contains a means for reversing the direction of rotation of the reed 5. This embodiment includes two pairs of legs 22, 23, 22' and 23'. The legs 22 and 23 extend substantially at right angles from the edges of the reed 5 in a counter-clockwise direction and provide for clockwise rotation of the reed 5. The legs 22' and 23' extend from the edges of the reed 5 substantially at right angles in a clockwise direction and provide counterclockwise rotation of the reed 5. A ratchet ring 30 is slidably mounted in the housing 2 to move between alternate positions engaging either the pair of legs 22 and 23 or the pair of legs 22' and 23'. A slide 31 is mounted on the exterior of the housing 2 and is fixed to the ratchet ring 30 by a rivet 32 passing through a longitudinal slot 33 in the housing 2. The ring 30 is moved between its alternate positions by sliding the slide 31 axially along the housing 2.

The ratchet ring 30 contains teeth 34 which are saw-tooth shaped with ramps 35 of equal slope on both sides of each tooth. The ramps 35 are sloped to cooperate with the ends of either pair of legs 22, 23, 22' and 23' to provide a unidirectional clutch. In other words, if the legs 22 and 23 engage the ratchet 30, they can only slip over the ratchet teeth 34 in a clockwise direction. Likewise, the legs 22' and 23' can only slip over the ratchet teeth 34 in a counterclockwise direction.

As an alternative embodiment to FIGS. 7 and 8, two unidirectional ratchets, having teeth like that shown in FIG. 2, could be used in place of the ratchet 30 and mounted on the slide 31 so that they would alternately engage the pairs of legs 22 and 23 or 22' and 23'.

An electrically driven embodiment is illustrated in FIG. 9. A cylindrical electro-magnet 38 is mounted in the housing 2 surrounding the reed 5. The electro-magnet 38 includes a winding 39 and a pair of energizing wires 40. The outer end of the reed 5 carries a small light-weight permanent magnet 41. The reed 5 and permanent magnet 41 have sufficient room within the electro-magnet 38 to vibrate or oscillate freely.

The electro-magnet 38 is energized with alternating current to oscillate the reed 5. If the A.C. current is 60 cycles/sec., the reed 5 will oscillate at a frequency of about 30 cycles/sec.

The curve shown in FIG. 10 explains the operation of the electrically energized embodiment shown in FIG. 9. The upper curve 43 in FIG. 10 represents the A.C. current flowing in the electro-magnet 38 and has a vertical ordinate of current and a horizontal ordinate of time. The lower curve 44 represents the operating cycle of the reed 5 and has a vertical ordinate indicating position relative to its centered position and a horizontal ordinate of time. When the current flows in the positive direction in the electro-magnet 38, it polarizes the magnet 38 in an opposite direction to the polarity of the permanent magnet 41. Hence, the reed 5 is drawn to one side (the left side shown in FIG. 10) of its centered position in the electro-magnet 38. About the time that the reed 5 reaches one end of its travel (the peak 45 of curve 44), the A.C. current reverses direction and changes the polarity of the electro-magnet 38 causing it to drive the permanent magnet 41 back toward its centered position.

As the reed 5 and permanent magnet 41 approaches or reaches the centered position, the polarity of the electro-magnet again changes and attracts the reed magnet 41. The inertia of the reed 5 will carry it through its centered position so that it will be drawn to the opposite end of its travel path by the attractive force between the electro-magnet 38 and the reed magnet 41. Again, as the reed magnet 41 reaches the opposite end of its travel (the peak 46 in curve 44), the polarity of the magnet changes and again drives the reed magnet 41 back toward its centered position.

With this explanation, it is believed that the operation of the electrically powered embodiment of FIG. 9 is clear. It also should be obvious at this time that the frequency of the reed 5 will be about one half the frequency of the A.C. current flowing in the electro-magnet.

Although several embodiments are illustrated and described in detail, it will be understood that the invention is not limited merely to these embodiments but contemplates other embodiments and variations which utilize the concepts and teachings of this invention.

Having described my invention, I claim:

1. A vibratory motor comprising:

(a) a hollow housing;

(b) an elongate flexible reed mounted in said housing for rotation about the longitudinal axis of the reed and housing one end free to vibrate;
(c) means connecting a vibrating portion of said reed to said housing causing said reed to rotate relative to said housing in a single rotary direction as it vibrates;
(d) means on said housing causing said reed to vibrate back and forth at substantially right angles to the axis of said housing; and
(e) a spindle connected to said reed to rotate with said reed for performing useful work.

2. A vibratory motor comprising:
(a) an elongate hollow housing;
(b) an elongate flexible reed having one end pivoted in said housing to rotate generally about the longitudinal axis of the reed, the other end of the reed being free to vibrate and flex back and forth at substantially right angles to its longitudinal axis;
(c) power means in said housing for causing said reed to vibrate;
(d) unidirectional clutch means connecting a vibrating portion of said reed to said housing for causing said reed to rotate in one direction relative to said housing as it vibrates; and
(e) a drive spindle rotatably mounted in said housing and connected to said reed to be rotated by the reed.

3. The motor of claim 2 wherein
(a) said power means includes a fluid jet.

4. The motor of claim 2 wherein
(a) said power means includes an electro-magnet.

5. The motor of claim 2 wherein
(a) said unidirectional clutch includes means for readily reversing the direction of rotation of said reed.

6. The motor of claim 2 wherein
(a) said unidirectional clutch includes a series of ratchet teeth and movable detents engaging the ratchet and arranged so that the detents can travel readily over the ratchet in one rotary direction and are prevented from traveling over the ratchet in the opposite direction.

7. The motor of claim 6 wherein
(a) said detents include a pair of bendable legs extending from opposite longitudinal edges of said reed.

References Cited by the Examiner
UNITED STATES PATENTS 1,952,341   3/34   Ude _____ 310—20
2,859,362   11/58  Niblick _____ 310—37

BROUGHTON G. DURHAM, *Primary Examiner.*